United States Patent [19]

Azkona

[11] Patent Number: 5,414,932
[45] Date of Patent: May 16, 1995

[54] PIPE CLAMPING DEVICE ON MANUAL PIPE CUTTERS

[75] Inventor: Manuel Azkona, Abadiano, Spain

[73] Assignee: Super-Ego Tools, S.A., Spain

[21] Appl. No.: 217,417

[22] Filed: Mar. 24, 1994

[30] Foreign Application Priority Data

Sep. 30, 1993 [ES] Spain .................................. 9302586

[51] Int. Cl.$^6$ ............................................. B23D 21/06
[52] U.S. Cl. ........................................... 30/96; 30/101; 30/102
[58] Field of Search .................... 30/96, 92, 93, 94, 95, 30/98, 99, 101, 102; 82/70.1, 70.2, 101

[56] References Cited

U.S. PATENT DOCUMENTS

| 2,283,572 | 5/1942 | Petersen | 30/102 |
| 2,706,853 | 4/1955 | Wilson | 30/102 |
| 5,129,158 | 7/1992 | Campagna | 30/92 |

Primary Examiner—Eugenia Jones
Attorney, Agent, or Firm—Lucas & Just

[57] ABSTRACT

Pipe clamping device on manual pipe cutters, in which there are two bearing points for the pipe on the head of the pipe cutter, a lever being pivoted on the head of the pipe cutter with a head for its bearing in working position on the pipe and a toothing for its locking with a pawl, and a spring is placed between the lever and the head of the pipe cutter, which tends to position the lever in open position.

2 Claims, 1 Drawing Sheet

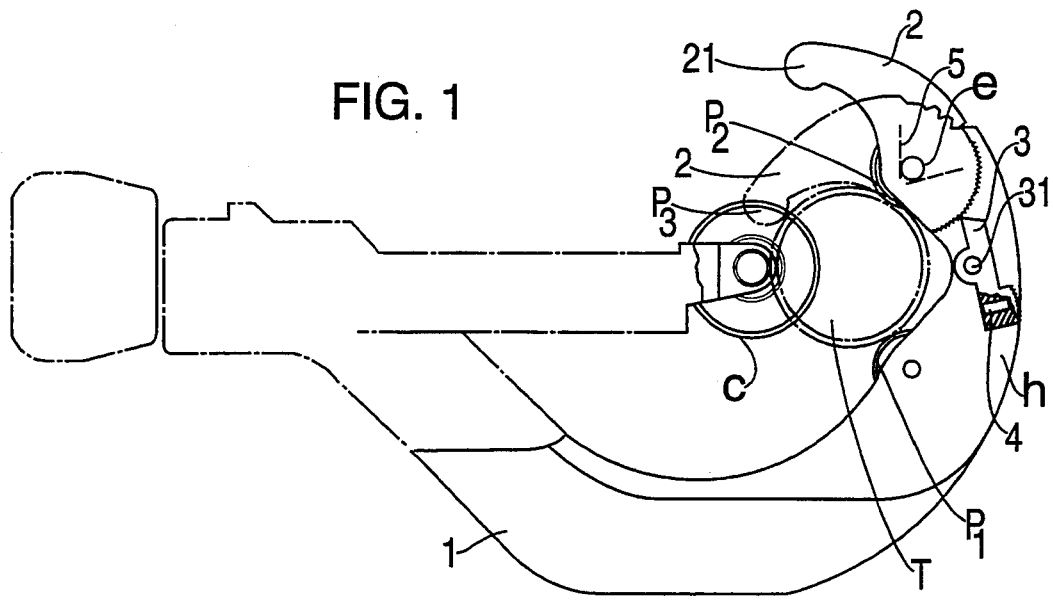
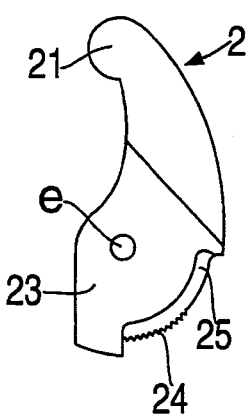
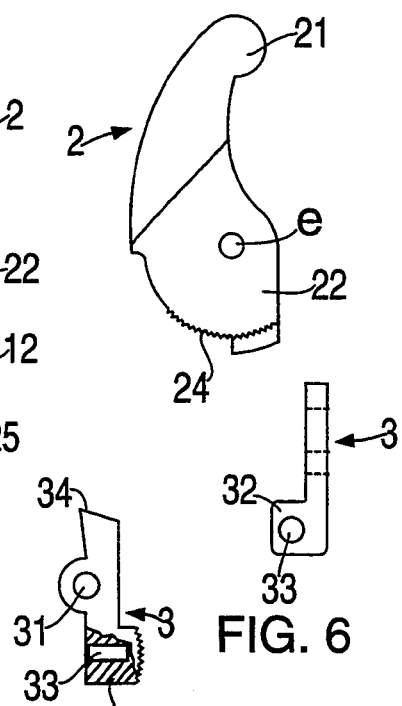

PIPE CLAMPING DEVICE ON MANUAL PIPE CUTTERS

This invention concerns a pipe clamping device on manual pipe cutters.

At present, the pipe is supported on manual pipe cutters at three points at least, two of which are located on the body of the pipe cutter and the third on the cutting wheel itself.

This system offers little clamping reliability, particularly on pipes of large diameters, which can even drop off during cutting operations.

The present invention concerns a pipe clamping device on manual pipe cutters, with the use of which the pipe is in every instance continuously clamped at three points at least, two of which are located on the body of the pipe cutter and the third on the clamping device itself, subject of the invention, so that these bearing points do not depend on the cutting wheel.

To understand the subject of this invention better, a preferred practical embodiment is represented on the plans, lending itself to accessory changes that do not alter it in principle.

FIG. 1 represents in elevation a manual pipe cutter with the pipe clamping device according to the invention.

This figure shows in dots and dashes the outline of a pipe cutter (1) and a pipe (T) ready to be cut, with the lever (2) in working position. The lever (2) is represented in open position by a solid line.

FIG. 2 represents a schematic front view corresponding to the previous figure.

FIGS. 3 and 4 each represent side views of the lever (2), in order to observe its construction and details.

FIGS. 5 and 6 each represent views in elevation and section of the pawl (3), in order to observe its construction and details.

A nonlimitative practical working example of this invention is described below. Other embodiments in which accessory changes that do not alter its principle are certainly not ruled out; rather, this invention also embraces all of its variants.

According to the invention, the pipe clamping device on manual pipe cutters contains a lever (2) and a pawl (3) mounted on the body (1) of the pipe cutter, particularly on its head (h) where the pipe (T) to be cut is placed.

Both components of the device—lever (2) and pawl (3)—can be engaged with each other and are mounted on the body (1) of the pipe cutter with the possibility of rocking on same and with means that tend to keep them in an interlocking position.

According to the embodiment represented, the lever (2) is constructed on an elongated one-piece body that forms, at one of its ends, a head (21) of curved configuration for support on the pipe (T) in working position, while the opposite end is branched into side wings (22), (23) with a pivot pin (e). One of the wings contains an end toothing (24), while the other presents an arched groove (25).

According to the embodiment represented, the pawl (3) is constructed on a one-piece body that pivots on the pin (31) on the body (1).

At one of its ends, the pawl (3) forms a head (32) for manual drive, which is housed on the recess (11) on the body (1).

In working position, once the head (21) is placed manually on the pipe to be cut (T), the nail (34) of the pawl (3) is engaged in the toothing (24), tending to be kept engaged by the action of a spring (4) housed in the recess and abutting against the body (1) of the pipe cutter.

In this working position we have three bearing points $(P_1)$, $(P_2)$, $(P_3)$ on the margin of the cutter (c)-pipe (T) coupling.

To unlock the pawl (3) and make possible free rocking of the lever (3)—between two end positions delimited by the amplitude of the arched groove (25) into which slides a stationary lug (12) emerging from the body (1)—, it is sufficient to press the head (32) of the pawl (3) so that the latter will rock, overcoming the stress of the spring (4).

A spring (5) is used, mounted on the lever pin (e) and with its ends positioned on the lever (2) itself and on the body of the pipe cutter (1), so that it preferably tends to position the lever constantly in the open position, even though comes within the scope of the invention for said spring (5) to perform the opposite function.

I claim:

1. A manual pipe cutting device for cutting pipe, said pipe cutting device comprising a body having two bearing points for engaging a pipe to be cut, a cutter connected to said body for cutting said pipe, and a lever pivotally attached at one end of said body, said lever having a head at its other end which provides a third bearing point adjacent to the cutter for engaging with said pipe to be cut, said lever having teeth at its attached end for engagement with a pawl pivotally attached to said body, said pawl having a nail at one end and said pawl being biased so that said nail engages said teeth on said lever.

2. The pipe cutting device of claim 1 wherein said lever is biased so that, when released from the nail of the pawl, the head of the lever moves away from the pipe to be cut.

* * * * *